United States Patent [19]
Blethen et al.

[11] 3,937,890
[45] Feb. 10, 1976

[54] REMOTE MONITORING COMMUNICATION SYSTEM AND TERMINAL FOR UTILITY METERS

[76] Inventors: William M. Blethen, 4 Noel Lane, East Brunswick, N.J. 08816; Lee J. Milligan, 14 Cheri Lane, Fairfield, N.J. 07006

[22] Filed: Apr. 16, 1974

[21] Appl. No.: 461,308

[52] U.S. Cl. .............................................. 179/2 A
[51] Int. Cl.² ....................................... H04M 11/02
[58] Field of Search .............. 179/2 A; 340/150, 151

[56] References Cited
UNITED STATES PATENTS

| | | | |
|---|---|---|---|
| 2,101,207 | 12/1937 | Williamson | 320/53 |
| 3,377,429 | 4/1968 | Schwartzkopf et al. | 179/6 |
| 3,400,378 | 9/1968 | Smith et al. | 340/172.5 |
| 3,508,243 | 4/1970 | Nyfeler et al. | 340/310 |
| 3,551,597 | 12/1970 | Russell | 179/2 A |

*Primary Examiner*—William C. Cooper
*Assistant Examiner*—C. T. Bartz

[57] ABSTRACT

A remote monitoring terminal is disclosed for connection with a utility meter to encode and store the meter readings in digital form. The terminal can be interrogated to obtain the stored reading in serial form suitable for encoding and transmission over a communication line. Means are provided to prevent the stored meter reading from being lost in the event of a line-power interruption. A communication system is disclosed including a central office and a plurality of such remote monitoring terminals for addressing each of such terminals to retrieve the stored information therein to the central office.

7 Claims, 5 Drawing Figures

REMOTE MONITORING COMMUNICATION SYSTEM AND TERMINAL FOR UTILITY METERS

BACKGROUND OF THE INVENTION

The present invention relates to a communication system for providing at a central office information concerning the content of any of a plurality of remotely located utility meters such as gas or electric meters.

DESCRIPTION OF THE INVENTION

In accordance with the invention, a remote monitoring communication system is provided including a remote monitoring terminal for use therein. An advantage of the terminal described herein is that it may be readily connected to existing utility meters in a manner described herein without adversely affecting the accuracy or reliability of such meters. For this purpose, there is provided a pulse output converter which includes a cam mountable on a shaft of the utility meter, preferably that shaft corresponding to the least significant digit of the count contained in the utility meter, and a switch operable by the cam to provide output pulses corresponding to increments in the least significant digit of the utility meter. Each remote monitoring terminal includes a secondary power supply for automatically supplying the minimum power requirement of the terminal necessary to avoid loss of the meter reading stored therein in the event of power failure.

A feature of the present invention is that the contents of the counter-memory in each remote monitoring terminal can be read by a data processing unit such as a digital computer located at a central office. The terminal can be readily connected to a bi-directional communication line, and includes means for reading out the stored binary number in serial form. Each remote terminal forming part of the communication system can be interrogated as to the contents of its counter-memory by the central office data processing unit. The terminal responds by serially strobing out the stored number corresponding to the meter reading. Cable television systems may serve as a suitable communication network linking the remote monitoring terminals with the central office.

The output of each remote monitoring terminal and that of the central office station may be converted to a form suitable for transmission over a CATV network or the like by suitable modulating devices, well known in this art and conventionally referred to as "modems." An address register is provided at each subscriber station which may be interrogated by the central office data processing unit for initiating operation of the particular station addressed to transmit the meter reading stored therein to the central office.

DESCRIPTION OF THE DRAWINGS

Preferred embodiments of the invention described below in connection with the accompanying drawings, in which:

FIG. 1 is a block diagram of a communication system in accordance with the invention in which a central office 10 is connected through a communication network 11, which may for example be a CATV network, to one or more subscriber stations 12, 12', etc.

Figure 1:
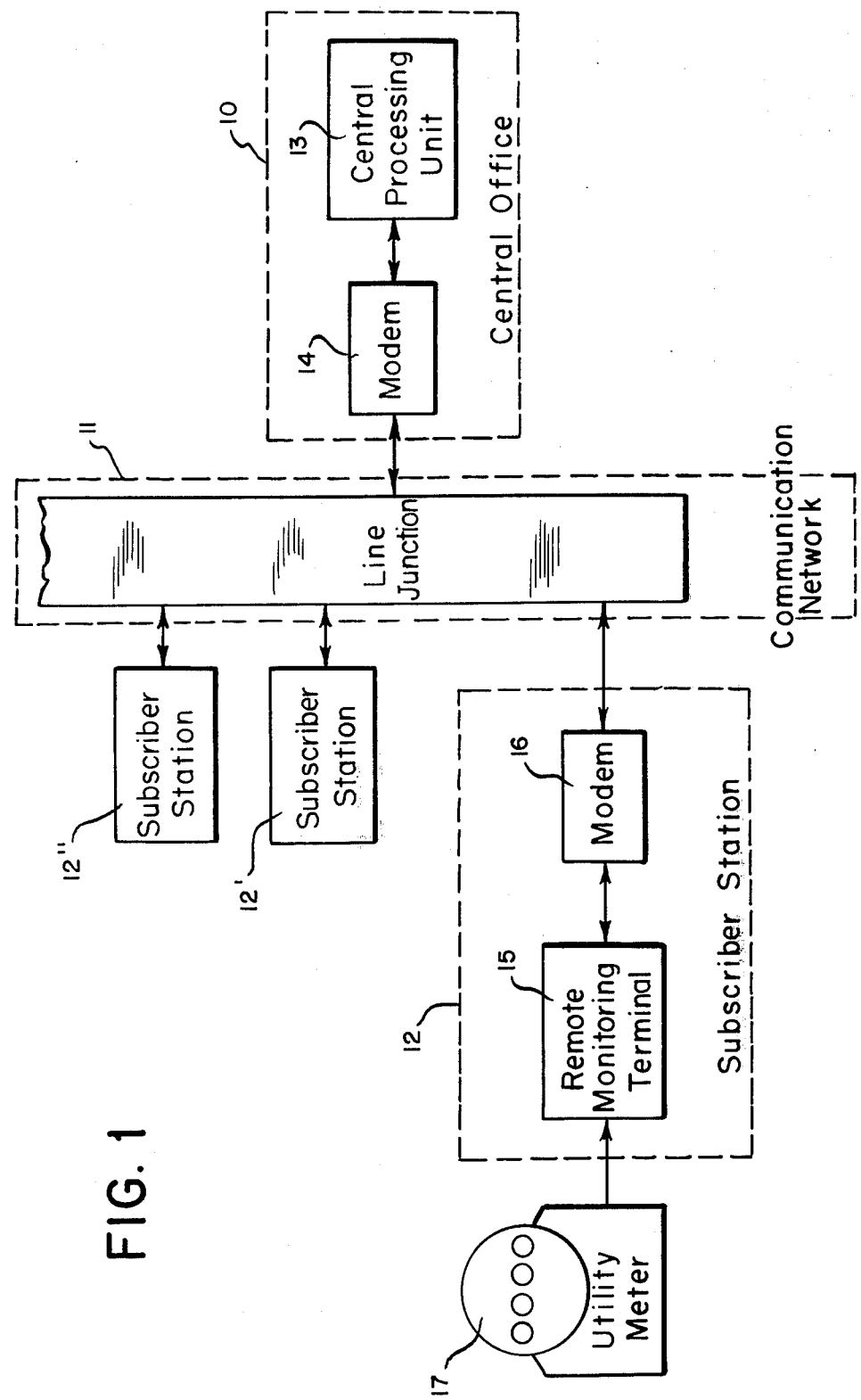
FIG. 1 is a block diagram of a remote monitoring communication system in accordance with the invention.

Central office 10 may include a central processing unit 13 connected through a modem 14 to the communication network 11, the modem 14 serving simply to convert the digital output of the central processing unit to a form compatible with the communication network, i.e., in the case of a CATV network a high frequency signal at frequencies within the coaxial cable transmission band. Data processing unit 13 in itself forms no part of the invention; it may be any commercially available unit programmed to store or to retrieve from external storage the addresses of the various subscriber stations, and to interrogate the various subscriber stations identified by such addresses and receive and store the information contained at such subscriber stations, which information may then be printed out in a conveniently useable form.

Each subscriber station 12 includes a remote monitoring terminal 15 connectable to the subscriber's utility meter, and a modem 16 compatible with modem 14 at the central office.

Figure 3:
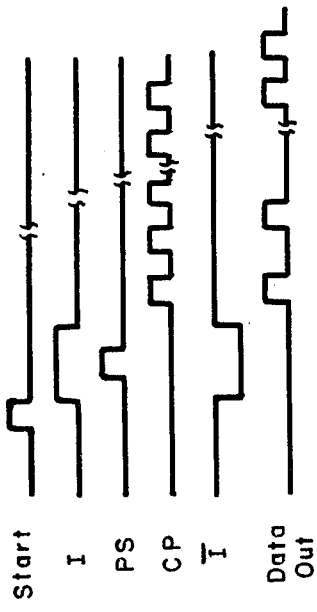
FIG. 3 is a schematic diagram of an output pulse generator mountable on a utility meter.

Each subscriber station is connected to a utility meter 17, the contents of which it is desired to read. Utility meter 17 may be any such meter currently in use, for example of the type which displays the amount of electricity or gas consumed in a series of dials. Such a utility meter may be modified for use in accordance with the present invention by mounting on the shaft of the least significant digit dial a pulser 18 as shown in FIG. 3. Pulser 18 includes a cam 19 mounted to rotate with the shaft, and a switch 20 the actuating arm 20' of which extends to cooperate with the cam 19 so that the switch 20 closes and opens 10 times during each revolution of the cam.

Figure 2:
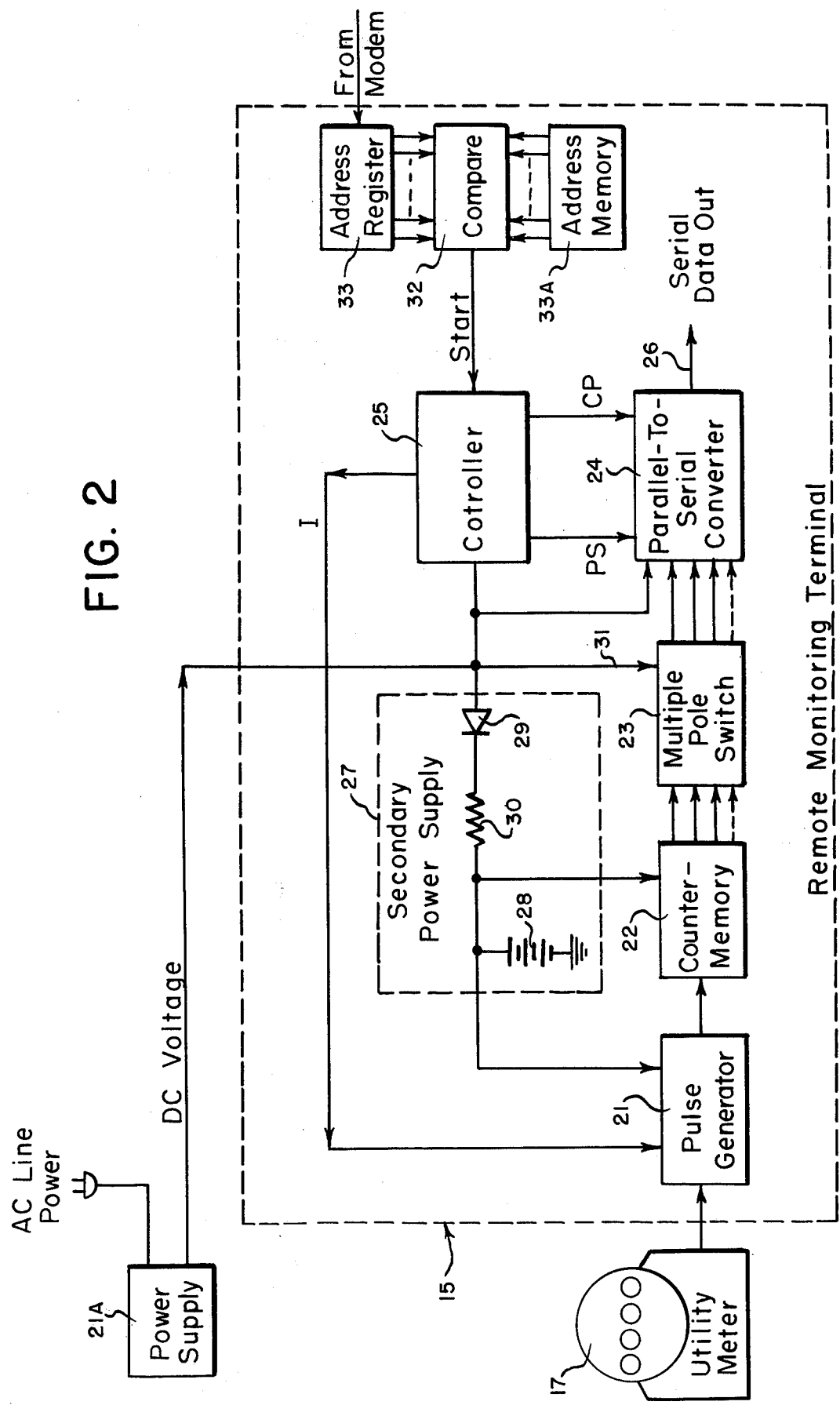
FIG. 2 is a block diagram of a subscriber station as shown in FIG. 1.

Remote monitoring terminal 15 is more fully illustrated in FIG. 2, where it is shown connected to a power supply 21A providing a DC voltage compatible with the requirements of the particular logic elements employed in the terminal.

In the event that terminal 15 is employed with a utility meter having a pulse output representative of the rate of gas or electric consumption that it is metering, that pulse output can be connected to pulse generator 21 in the terminal 15. If the utility meter does not have such pulse output capability, terminal 15 may include a pulser 18 and the output from switch 20 is connected to the input of pulse generator 21.

Each time switch 20 closes, a pulse is generated by pulse generator 21, which may be a multivibrator connected as a one-shot, or single pulse generator. These pulses are fed into counter-memory 22, a binary counter which thereby stores a count corresponding to the total consumption of gas or electricity registered by the utility meter. Counter-memory 22 is connected in parallel through multiple-pole switch 23 to a parallel-to-serial converter 24 which, upon receipt of appropriate signals from controller 25, serially outputs the number stored in counter-memory 22 over output line 26 to modem 16.

In the event of failure of power supply 21A to maintain the required output voltage, a secondary power supply 27 is provided which is connected to power pulse generator 21 and counter-memory 22, thereby preventing loss of the count stored in counter-memory 22 and permitting it to continue registering additional use of the utility product despite loss of external power. For this purpose, secondary power supply 27 includes a battery 28 connected through diode 29 and resistor 30 to receive a constant trickle charge from power supply 21A, thereby maintaining it in a fully charged condition. In the event that the power supply output voltage drops below the output voltage of battery 28, the battery continues to supply power to pulse generator 21 and counter-memory 22, diode 29 preventing the battery from draining through the power supply or other circuit elements. Diode 29 is connected to prevent current from battery 28 from energizing control input 31 to switch 23, energization of which by power supply 21A is required to provide transmission paths from counter-memory 22 to parallel-to serial converter 24. Switch 23 is thus closed only when adequate line voltage is present from the power supply, and is opened in the event of power supply failure to prevent circuit elements not required for accumulating the count in the utility meter from draining battery 28. In this manner, secondary power supply 27 may be considered as supplying a control signal (i.e., the absence of a positive signal to control input 31 of multiple-pole switch 23) to open the signal path between counter-memory 22 and parallel-to-serial converter 24.

Preferably, pulse generator 21 and counter-memory 22 incorporate CMOS (Complimentary Metal Oxide Semiconductor) intergrated circuits, the current drain of which is minimal, thereby permitting operation by battery 28 for extended periods of time. Multiple-pole switch 23 is preferable a solid state switching element, and may for example be a CD4016A logic element manufactured by Radio Corporation of America. Control input 31 is that input, energization of which closes all of the switched transmission paths in the multiple-pole switch connecting counter-memory 23 and converter 24. Operation of subscriber station 12 will further be explained in conjunction with FIG. 5, which is a logic diagram of the circuit of controller 25.

To address a specific subscriber station in the embodiment shown, the central processing unit sends out over the communication network to all subscriber stations a signal corresponding to the address of the selected subscriber station. This address signal may be preceded by a signal of selected frequency or duration recognizable by all of the subscriber station modems for clearing their associated address registers. The address signal is received by an address register 33, which is a shift register such that the serially transmitted address may be stored therein and compared with the address of the particular subscriber station contained in address memory 33A, which for example may be a conventional read-only memory. A start signal is generated by comparator 32 of the particular subscriber station addressed when the addresses in registers 33 and 33A compare positively. A logic diagram of controller 25, to which the start signal is applied, appears in FIG. 4. The start signal is fed to a one-shot 34, the output of which clears seven-stage binary counter 35 and additionally actuates one-shot 36, the complement output of which triggers one-shot 37 causing the latter to generate a control signal denominated PS, or parallel shift, which is shown in FIG. 2 is fed to the control input of parallel-to-serial converter 24 causing the latter to sample the contents of counter-memory 22.

Prior to generation of the PS signal, an inhibit signal I is generated by one-shot 34, which serves to inhibit operation of pulse generator 21 during parallel transfer of the count sample in the counter-memory into the parallel-to-serial converter, thereby preventing an input pulse to the counter-memory which might interfere with the transfer. The duration of pulse I (i.e., the time constant of one-shot 34) is preferably made slightly longer, for this purpose, than the time required for such transfer.

When binary counter 35 is cleared, the outputs of the 4th and 6th stages become zero, causing NAND-date 38 to provide a one output to gated clock 39, causing the clock to generate clock pulses CP at the desired strobing frequency for serially strobing out the contents of the parallel-to-serial converter. Gated clock 39 may be a free running multivibrator connected to an AND-gate (not shown) the other input of which is that shown and which receives signals from gate 38. The first several clock pulses are inhibited by the complement of inhibit signal I, generated by one-shot 34, which maintains AND-gate 40 closed to prevent serial transfer from the parallel-to-serial converter until completion of the parallel transfer into it. Upon termination of the inhibit input to AND-gate 30, the AND-gate begins to pass clock pulses, feeding them back to the input of binary counter 35 and causing that counter to begin counting. Such pulses CP are also provided to the strobe input of parallel-to-serial converter 24, causing the contents thereof to be read out over output line 26 to modem 16 for transmission over the communication network to the central office. Clock pulses from gated clock 39 may also be fed directly to the modem for synchronization, if required by the modem.

When binary counter 35 reaches a count of 80, the fourth and sixth stage outputs become ones changing the output of NAND-gate 38 to a zero and thereby turning off gated clock 39, completing the cycle of operation of the remote monitoring terminal. While a 80 bit cycle is shown in this embodiment, any number of shift pulses may be chosen depending upon the number of bits stored in counter-memory 22 and which must therefore be serially shifted out of parallel-to-serial converter 24.

Figure 5:
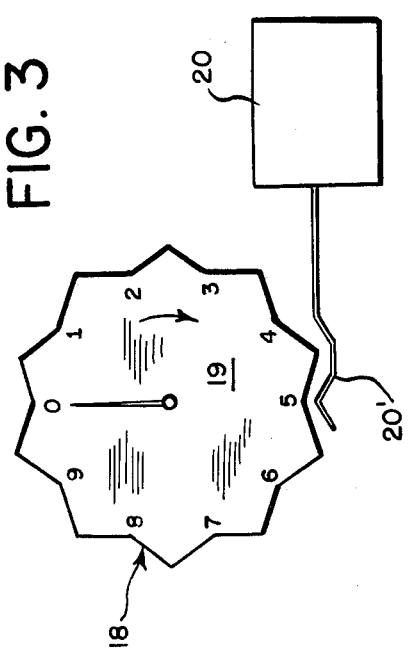
FIG. 5 is a timing diagram showing the relative timing of the signals generated in connection with the operation of the remote monitoring terminal.
Figure 4:
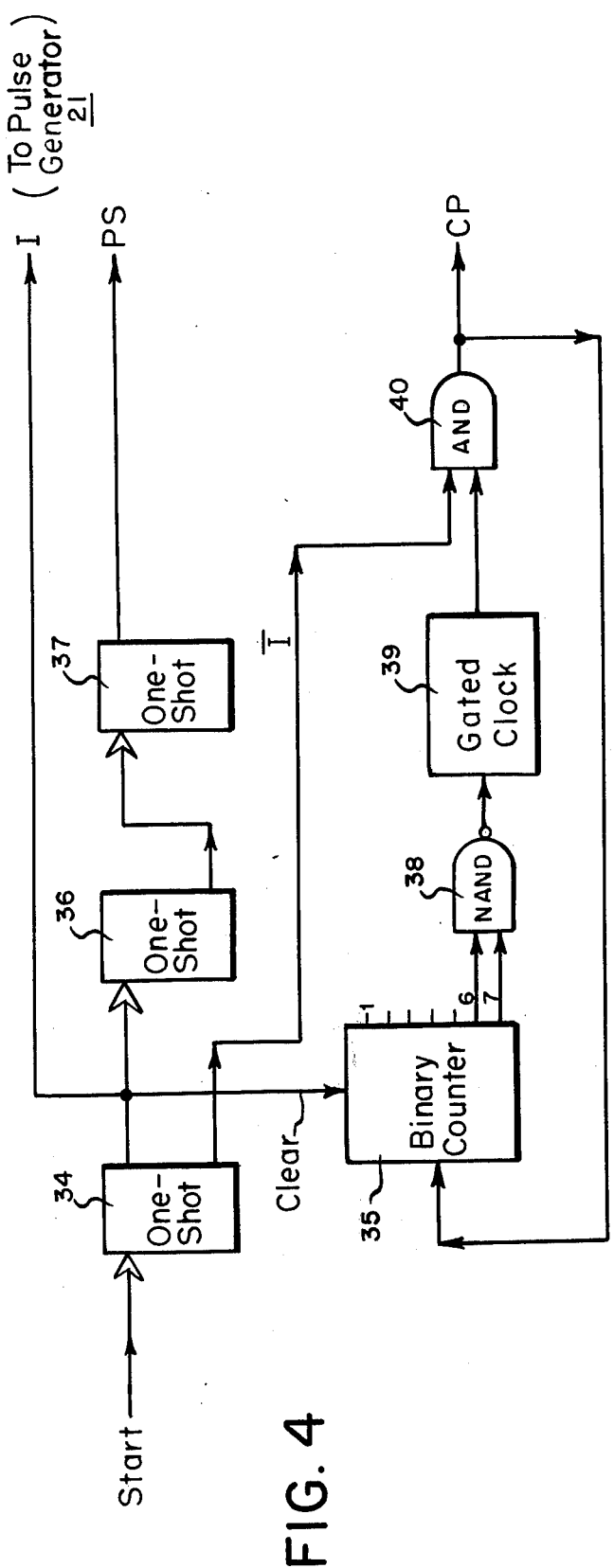
FIG. 4 is a schematic view of a control logic generator as shown in FIG. 2.

FIG. 4 is a timing diagram further illustrating the operation of the control logic shown in FIG. 5 and presenting in graphic form the sequence of operations described above.

It will be appreciated by those skilled in the art that various changes and modifications may be made to the above-described preferred embodiments without departing from the scope and spirit of the invention defined by the claims herein.

We claim:

1. A remote monitoring terminal for connection with a utility meter capable of providing output pulses corresponding to increments in the count stored therein, said terminal being operable from a power supply and comprising:
   a. counter-memory means responsive to such utility meter output pulses for maintaining a count corresponding to that indicated by the meter;
   b. a parallel-to-serial converter connected to sample in parallel the contents of the counter-memory means;

c. a multiple-pole switch connected between the counter-memory means and the parallel-to-serial converter responsive to a control signal for interrupting the current paths therebetween;

d. a controller connected to the parallel-to-serial converter for initiating parallel sampling of the contents of the counter-memory means into the parallel-to-serial converter and serially strobing said contents therefrom; and e. secondary power supply means, responsive to failure of the power supply to maintain a predetermined voltage, for supplying operating power to at least the counter-memory means and for controlling said multiple-pole switch to disconnect the parallel-to-serial converter from the counter-memory means, thereby minimizing the drain on the secondary power supply.

2. A remote monitoring terminal as defined in claim 1, and including a pulse generator responsive to pulses from said utility meter for providing input pulses to the counter-memory means, wherein said secondary power supply means includes a battery connected to be charged by the power supply, and switching means responsive to a drop in the power supply voltage below that of said battery for (a) providing a control signal to the multiple pole switch for disconnecting the parallel-to-serial converter from the counter-memory means, and (b) for controlling the battery to supply power only to the pulse generator and counter-memory means.

3. A remote monitoring terminal as defined in claim 2 wherein said switching means is a diode.

4. A remote monitoring terminal as defined in claim 1 including a pulse output converter for providing output pulses from a utility meter corresponding to increments in the count stored therein, comprising a cam mountable on the shaft of the utility meter corresponding to the least significant digit of said count, and a switch operable by said cam to provide output pulses corresponding to increments in such least significant digit.

5. A remote monitoring system operable over a communication network for selectively monitoring the contents of utility meters at remote locations and transmitting such contents upon command to a central office, said system including:

a. a central office including a data processing unit, means for generating an address signal corresponding to an address of a selected subscriber station for addressing any of a plurality of remote monitoring terminals to obtain data stored therein, and a modem for connecting the data processing unit with such communication network; and b. a plurality of subscriber stations, each including a modem connected to such communication network for communicating therethrough with the central office, means for receiving an address signal, an address memory for storing an address corresponding to said subscriber station, and a comparator for comparing addresses corresponding to received address signals with the address stored in the address memory, each subscriber station thereby being selectively addressable by said data processing unit, and each subscriber station including a remote monitoring terminal connected to a utility meter at the subscriber station for serially transmitting to such data processing unit a count corresponding to that contained in the utility meter, said remote monitoring terminal including a pulse output converter for providing output pulses from such utility meter corresponding to increments in the count stored therein, said converter comprising a cam mountable on the shaft of the utility meter corresponding to the least significant digit of said count, and a switch operable by said cam to provide output pulses corresponding to increments in such least significant digit.

6. A remote monitoring system as defined in claim 5 wherein each of said remote monitoring terminals includes a. counter-memory means responsive to such utility meter output pulses for maintaining a count corresponding to that stored in the meter;

b. a parallel-to-serial converter connected to receive a sampling of the counter-memory means; and c. a controller connected to the parallel-to-serial converter for initiating parallel transfer of the sample of the counter-memory means into the parallel-to-serial converter and serially strobing said sample therefrom through said modem and communication network to the data processing unit.

7. A remote monitoring system as defined in claim 6 operable from a power supply and wherein each of said remote monitoring terminals includes:

a. a multiple-pole switch connected between the counter-memory means and the parallel-to-serial converter responsive to a control signal for interrupting the current paths therebetween; and b. a secondary power supply means, responsive to failure of such power supply to maintain a predetermined voltage, for supplying operating power to at least the counter-memory means and for controlling said multiple-pole switch to disconnect the parallel-to-serial converter from the counter-memory means, thereby minimizing the drain on the secondary power supply.

* * * * *